United States Patent [19]

Ichida et al.

[11] 4,137,549
[45] Jan. 30, 1979

[54] DPCM CODING APPARATUS

[75] Inventors: Takeshige Ichida, Hirakata; Kunihiko Hontani, Katano; Tetsuro Hanaoka, Nara, all of Japan

[73] Assignee: Matsushita Electric Industrial Co., Ltd., Osaka, Japan

[21] Appl. No.: 784,470

[22] Filed: Apr. 4, 1977

[30] Foreign Application Priority Data

Apr. 6, 1976 [JP] Japan .................................. 51-38974

[51] Int. Cl.² .............................................. H04N 9/02
[52] U.S. Cl. ..................................................... 358/13
[58] Field of Search ................................ 358/8, 12, 13

[56] References Cited
U.S. PATENT DOCUMENTS 3,921,204  11/1975  Thompson ............................ 358/13

Primary Examiner—Robert L. Richardson
Attorney, Agent, or Firm—Stevens, Davis, Miller & Mosher

[57] ABSTRACT

A DPCM coding apparatus adapted for directly coding a composite color television signal is disclosed which carries out a so-called two-dimensional prediction using horizontal and vertical signals from a predetermined earlier period as predict value for DPCM while taking the color sub-carrier wave into consideration. The two-dimensional prediction allows immediate restoration after dropout of the coded signal should this occur.

9 Claims, 7 Drawing Figures

FIG.6 j-th LINE
(j+1)th LINE

X1a  X1b  X1c  X2a  X2b  X2c  X3a

VIDEO INPUT — A/D CONVERTER (1) — (2) — CODING CIRCUIT (3) — CODED OUTPUT
PREDICTION CIRCUITRY (5) — (4)

j-th LINE $X_{(n-228)a}$   $X_{(n-227)a}$ (j+1)th LINE $X_{(n-1)a}$   $X_{na}$ $X_{(n-2)c}$   $X_{(n-1)c}$

DPCM CODING APPARATUS

FIELD OF THE INVENTION

The present invention relates to a DPCM (differential pulse code modulation) coding apparatus for directly coding a composite color television signal, and more particularly to a two-dimensional high order DPCM coding apparatus.

Heretofore, a one-dimensional high order DPCM apparatus has been known as an apparatus for directly coding the composite color television signal.

DETAILED DESCRIPTION

Figure 1:
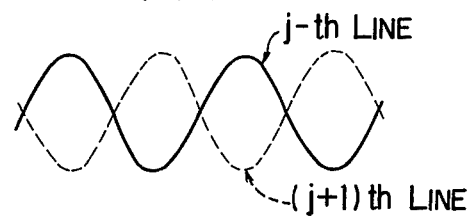
FIG. 1 shows the waveform of the color signal component, a phase of which is reversed for each horizontal scan line.
Figure 2:
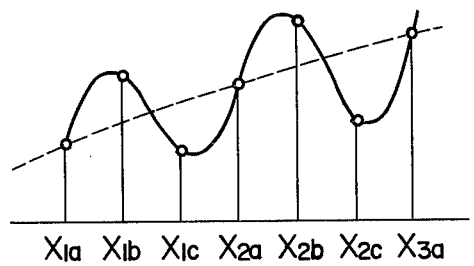
FIG. 2 shows sampling points and points which are utilized for explaining a prior art one-dimensional high order DPCM coding system.
Figure 3:
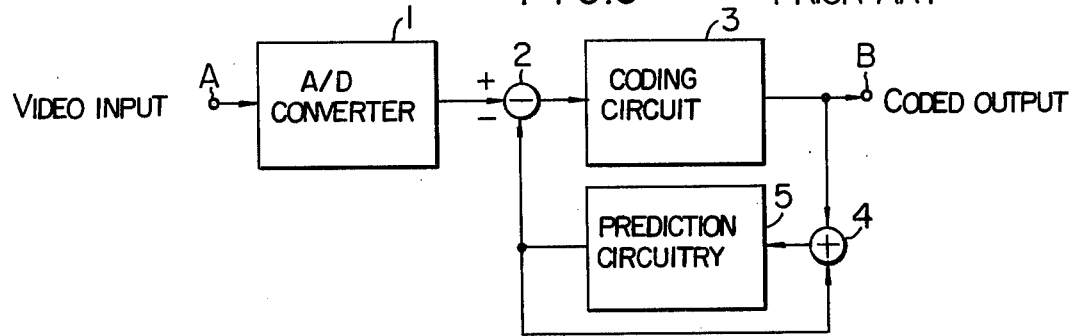
FIG. 3 is a block diagram illustrating the basic configuration of a prior art one-dimensional high order DPCM coding apparatus.

Referring to FIGS. 1, 2 and 3, a prior art one-dimensional high order DPCM apparatus will be explained.

A composite color television signal comprises a luminance signal on which a color signal modulated by a color sub-carrier frequency is superimposed. The phase of the color signal is reversed for each horizontal scan line (see FIG. 1). Accordingly, when coding the composite color television signal directly, the periodicity of the sub-carrier wave must be taken into consideration because a value one dot earlier cannot be used as a prediction value. Thus, the sampling frequency is set to an integer times the frequency of the color sub-carrier wave and the value of the dot of the composite color television signal one period earlier is used as the prediction value. More particularly, when the sampling frequency is set equal to three times the color sub-carrier wave frequency, the value at the point three dot periods earlier is used as the prediction value. In such a system, when there is no change of color, a change in the luminance signal is detected as a differential signal. In FIG. 2, for example, prediction for $x_{2a}$ is carried out at $x_{1a}$, prediction for $x_{2b}$ is carried out at $x_{1b}$ and prediction for $x_{2c}$ is carried out at $x_{1c}$.

FIG. 3 shows a configuration for carrying out the above coding system. In FIG. 3, numeral 1 denotes an analog-digital (A/D) converter, 2 a subtraction circuit, 3 a coding circuit, 4 an adding circuit and 5 a prediction circuit which may be basically a three dot period delay circuit etc.

Such a prior art high order DPCM coding apparatus, however, is a one-dimensional prediction apparatus which utilizes only a correlation in the horizontal direction. Therefore, when errors such as a dropout error etc. of the DPCM signal which is once coded occur on the transmission path or in the recording system, the influence of such an error remains until the termination of the scan line in question.

It is an object of the present invention to provide a DPCM coding apparatus which is capable of immediately making restoration from the influence of errors such as dropout etc. in a coded signal when such an error occurs.

In order to attain the above object, the present invention carries out a so-called two-dimensional prediction in which signals in both horizontal and vertical relation at a fixed period earlier are used as the prediction value for DPCM while taking the color sub-carrier wave into consideration.

According to the present invention, a composite color television signal is sampled by a sampling signal having a frequency which is m times as high as the frequency of the color sub-carrier wave and a signal value at least m dot (sample) periods earlier is used as a part of the prediction value in a prediction circuit, and a signal value m × k dot periods earlier, i.e., approximately one horizontal period earlier, is also used as a part of the prediction value. Such a prediction circuit may comprise an m-bit delay line and an m × k -bit delay line each connected to an output of a coding circuit, a weighting circuit for weighting outputs from the respective delay lines and an adding circuit for summing the weighted values to produce the prediction value.

Referring to FIGS. 4 to 7, the preferred embodiments of the present invention will be explained.

Figure 4:
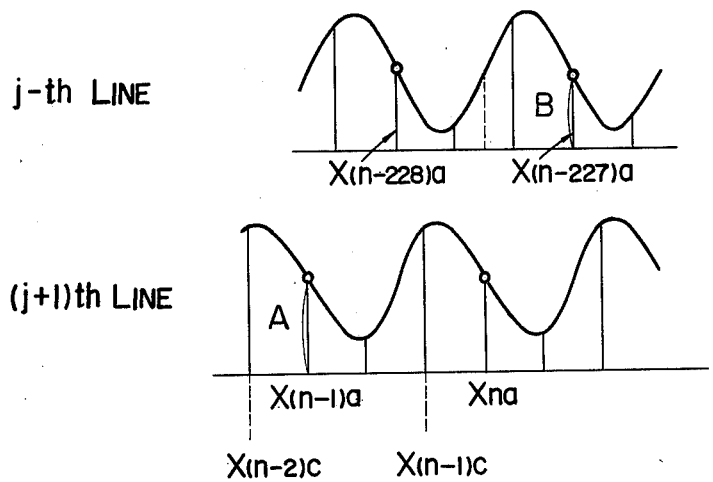
FIG. 4 shows sampling points and points which are utilized for explaining the basic theory of the present invention.

FIG. 4 shows sampling points for the j-th line and the (j+1)th line when a composite color television signal is sampled in synchronism with a frequency which is three times as high as the frequency of the color sub-carrier wave.

As shown in FIG. 4, since the phase of the color sub-carrier wave changes by 180 degrees for each horizontal scan line, a sampling point one horizontal scan line earlier is shifted in the horizontal direction by a distance of a 1½ times the dot period.

As a prediction value for coding a signal at a point $x_{na}$, a value at a point $x_{(n-1)a}$ which occurs a three dot period earlier is used as a part of the prediction value, and a value at a point $x_{(n-227)}$ which occurs approximately one line period earlier is also used as another part of the prediction value. The prediction value $\bar{x}_a$ at the point $x_{na}$ is given by;

$$\bar{x}_a = \alpha A + \beta B \qquad (1)$$

where A and B are values at the points $x_{(n-1)a}$ and $x_{(n-227)a}$, respectively, and $\alpha$ and $\beta$ are weighting factors. As an example, $\alpha$ and $\beta$ may each be equal to ½. The values of $\alpha$ and $\beta$ are not always necessarily ½. In the above, an arrangement limiting the point which is utilized on the same scan line to the point $x_{(n-1)a}$ which occurs three dot periods earlier is described for the sake of convenience of explanation; however, the point which occurs one dot periods earlier and the point which occurs four dot period earlier may be used in addition to the point which occurs three dot periods earlier.

Furthermore, in the above is described a limiting point utilized in the preceding line (j-th line) to the point $x_{(n-227)a}$, the point to be utilized may be the point $x_{(n-228)a}$ which is three dot periods earlier than the point $x_{(n-227)a}$ or the combination of the point $x_{(n-227)a}$ and the points before and after the point $x_{(n-227)a}$.

Basically, since the horizontal prediction value includes at least the value at the point $x_{(n-1)a}$, the point $x_{(n-227)a}$ is selected as the center such that on the reproduced picture, the vertical prediction point may be placed in the reverse direction in the horizontal direction with respect to the point $x_{(n-1)a}$ with the signal position ($x_{na}$) to be coded therebetween. Namely, for the signal $x_{na}$ at the point to be coded, the signal $x_{(n-227)a}$ at the sampling point which occurs later than the point which is one horizontal scan period earlier is selected.

The selection of the signal $x_{(n-227)a}$ is made to improve the accuracy of prediction. By using the point $x_{(n-1)a}$ as a point on the same line on which the point $x_{na}$ exists and the point $x_{(n-227)a}$ which is later in time than the point which is one horizontal scan period earlier as a point on the line which is one line earlier, prediction values are obtained from the left and right, on the screen or picture, of the point $x_{na}$ where coding is to be made. Therefore, in comparison with the case in which prediction values are obtained from the points such as $x_{(n-1)a}$ and $x_{(n-228)a}$ which are both at the left on the screen, of the point $x_{na}$, a better mean value of the picture can be obtained and it is possible to reduce the prediction error.

In the NTSC system, if the sampling points are counted continuously even during a horizontal blanking period, the color subcarrier frequency $f_{sc}$ is equal to 455 $f_H/2 = 227.5\ f_H$, where $f_H$ is the line frequency. Therefore, the number 227 is derived from the fact that 227.5 cycles of sub-carrier exist in one horizontal period.

Figure 5:
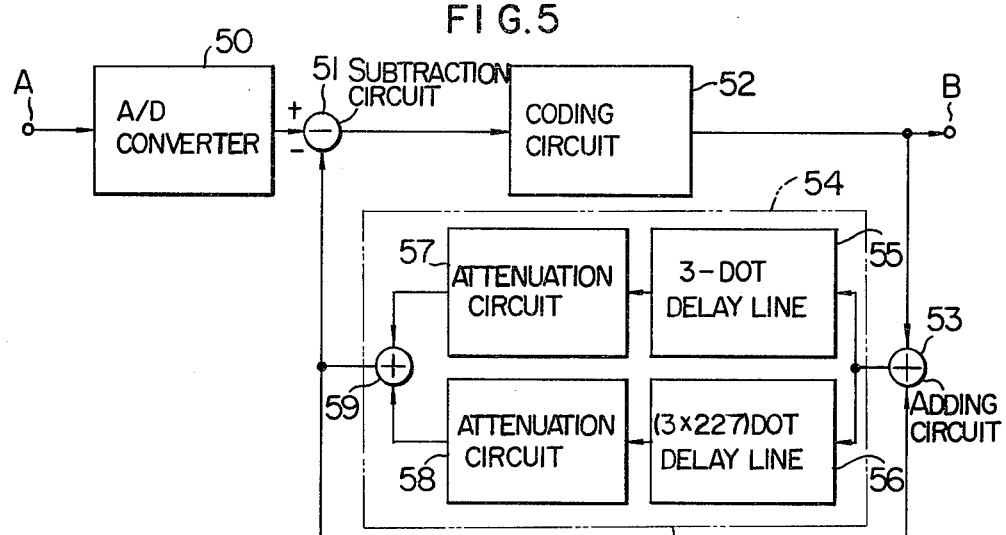
FIG. 5 is a block diagram illustrating a two-dimensional high order DPCM apparatus in accordance with one embodiment of the present invention.
Figure 6:
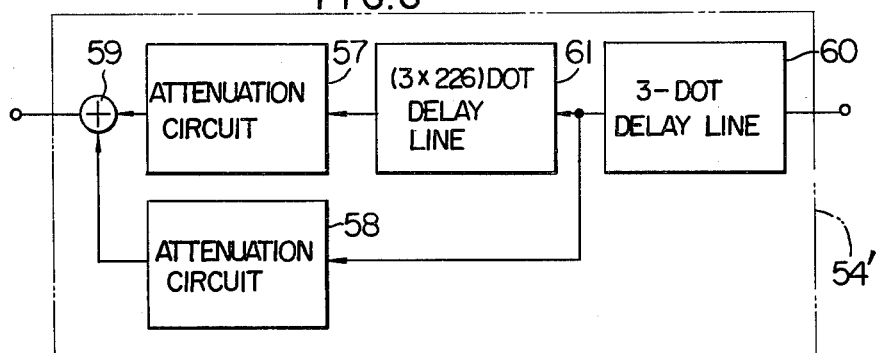
FIGS. 6 and 7 are each block diagrams of prediction circuits used in the present invention.
Figure 7:
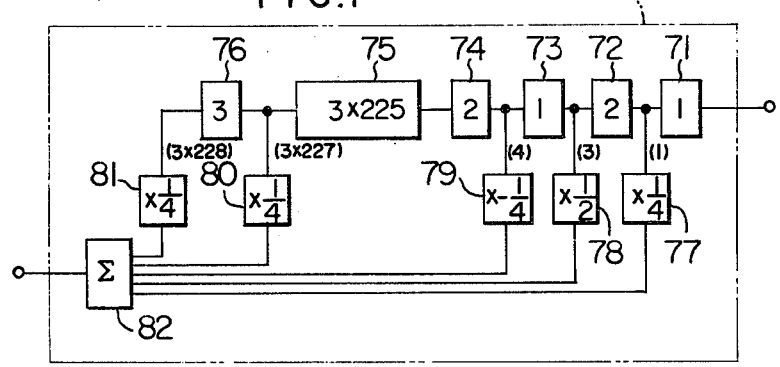

Referring to FIGS. 5 to 7, particular embodiments will now be explained.

In FIG. 5, numeral 50 denotes an A/D converter, 51 a subtraction circuit, 52 a coding circuit, 53 an adding circuit, 54 prediction circuitry including a three-dot delay line 55, a 3 × 227 dot delay line 56, attenuation circuits 57 and 58 for multiplying $\alpha$ and $\beta$ shown in equation (1) and an adding circuit 59.

The operation is explained below. A composite color television signal supplied to an input terminal A is converted into a digital signal in the A/D converter 50 and thence applied to the subtraction circuit 51 where a difference signal between the digital signal and an output of the prediction circuitry 54 is produced. The number of available bits of the difference signal are compressed by the coding circuit 52 and the compressed bits are supplied to an output terminal B as a coded output signal. In the prediction circuitry 54, the output of the three-dot delay line 55 is attenuated by the factor $\alpha$ by the attenuation circuit 57 while the output of the 3 × 227 dot delay line 56 is attenuated by the factor $\beta$ by the attenuation circuit 58. Outputs of the attenuation circuits 57 and 58 are added together by the adding circuit 59 to produce $\bar{x}$ in equation (1) as an output thereof.

The prediction circuitry 54 need not be limited to that shown in FIG. 5 but other circuit configurations such as that shown in FIG. 6 may be used. In FIG. 6, the attenuation circuits 57 and 58 and the adding circuit 59 are the same as those shown in FIG. 5. Numerals 60 and 61 designate a three-dot delay line and a 3 × 226 dot delay circuit, respectively. The prediction circuitry 54' in FIG. 6 uses the three-dot delay means shown in FIG. 5 in common, and it is essentially equivalent to the prediction circuitry 54 shown in FIG. 5. Furthermore, by stopping the clock of the delay circuit during the horizontal blanking period, the delay circuit 61 may be of smaller capacity.

The thought of this invention can be applied without limiting the point to be utilized in the same scan line to the point $x_{(n-1)a}$ which is three dot periods earlier, but in the case in which the point $x_{(n-1)c}$ which is a one dot period earlier and the point $x_{(n-2)c}$ which is four dot periods earlier are used in addition to the point $x_{(n-1)a}$, and for the vertical direction, the points $x_{(n-228)a}$ and $x_{(n-227)a}$ are used. In this case, the prediction value $\bar{x}_a$ may be $$\bar{x}_a = \tfrac{1}{4}x_{(n-1)a} + \tfrac{1}{4}x_{(n-1)c} - \tfrac{1}{4}x_{(n-2)c} + \tfrac{1}{4}x_{(n-227)a} + \tfrac{1}{4}x_{(n-228)a} \qquad (2)$$

FIG. 7 shows the configuration of a prediction circuitry 54″ for obtaining the above prediction value. In FIG. 7, numerals 71 and 73 denote one-dot delay lines, 72 and 74 denote two-dot delay lines, 75 denotes a 3 × 225 dot delay line and 76 denotes a three-dot delay line. Numerals 77, 78, 79, 80 and 81 denote attenuation circuits for multiplying factors of $+\tfrac{1}{4}$, $+\tfrac{1}{4}$, $-\tfrac{1}{4}$, $+\tfrac{1}{4}$, and $+\tfrac{1}{4}$, respectively. Numeral 82 denotes an adding circuit for summing the outputs of the attenuation circuits 77 to 81. By the use of the prediction circuitry 54″, more precise prediction value can be obtained.

As seen from the above description, in the DPCM coding of the present invention, since not only horizontal correlation but also vertical correlation are used to obtain the prediction value, the compression rate is enhanced. Furthermore, when errors in the coded signal occur in the transmission system or the recording system, that error does not persist until the reset (usually until the horizontal blanking period) but decays exponentially. Accordingly, the error is substantially extinguished in a small number of cycles. Thus, even if an error signal occurs, it is possible to make the adverse effect due to the error inconspicuous.

Further, only a delay line of approximately one horizontal period is required to be provided additionally in the circuit; therefore, the construction of the circuit may be made simple.

What is claimed is:

1. A DPCM coding apparatus wherein a composite color video signal is sampled at a frequency which is m times as high as the frequency of the sub-carrier wave, where m is an integer, and wherein the sampled signals are converted to coded digital signals for coding of a prediction value at a selected point, comprising prediction means for producing a prediction signal including delay means having at least first and second delay circuits, said first delay circuit delaying said coded signals by m dot periods; and said second delay circuit delaying said coded signals by m × k dot periods, where k is an integer, and producing at the output thereof a signal at a sampling point which occurs later than the point which is one horizontal scan period earlier than the signal at said selected point, and adding means for scanning predetermined fractions of the outputs of said first and second delay circuits, and means for coding the difference between said digital signal and prediction signal.

2. A DPCM coding apparatus according to claim 1 wherein said second delay circuit comprises an m (k − 1) dot delay circuit connected to the output of said first delay circuit.

3. A DPCM coding apparatus according to claim 1 wherein said delay means further includes a third delay circuit for delaying said coded signals by one dot period, and a fourth delay circuit for delaying said coded signals by (m + 1) dot periods; means for multiplying the outputs of said third and fourth delay circuits by predetermined respective coefficients, the coefficients of the outputs of said third and fourth delay circuits being of opposite polarity with respect to each other; and means for adding the outputs of said third and fourth delay circuits, after multiplying by said predetermined respective coefficients, to the outputs of said first and second delay circuits to obtain said prediction value.

4. A DPCM coding apparatus according to claim 1 wherein said adding means adds a signal obtained by multiplying the output of said first delay circuit by ½, and a signal obtained by multiplying the output of said second delay circuit by ½.

5. A DPCM coding apparatus according to claim 4, wherein said adding means adds a signal obtained by multiplying the output of said first delay circuit by ½, a signal obtained by multiplying the output of said second delay circuit by ½, a signal obtained by multiplying the output of said third delay circuit by ¼ and a signal obtained by multiplying the output of said fourth delay circuit by ¼.

6. A DPCM coding apparatus wherein a composite color video signal is sampled at a frequency which is m times as high as the frequency of the sub-carrier wave, where m is an integer, and wherein the sampled signals are converted to coded digital signals for coding of a prediction value at a selected point, comprising
    prediction means for producing a prediction signal including
        delay means having first, second and third delay circuits, said first delay circuit delaying said coded signals by m dot periods; said second delay circuit delaying said coded signals by m × k dot periods, where k is an integer, and producing at the output thereof a signal at a sampling point which occurs later than the point which is one horizontal scan period earlier than the signal at said selected point; and said third delay circuit delaying said coded signal by m × (k + 1) dot periods corresponding to approximately one horizontal scan period, and
    adding means for scanning predetermined fractions of the outputs of said first and second delay circuits, and means for coding the differences between said digital signal and said prediction signal.

7. A DPCM coding apparatus according to claim 6, wherein said adding means adds a signal obtained by multiplying the output of said first delay circuit by ½, a signal obtained by multiplying the output of said second delay circuit by ½, and a signal obtained by multiplying the output of said third delay circuit by ¼.

8. A DPCM coding apparatus wherein a composite color video signal is sampled at a frequency which is m times as high as the frequency of the sub-carrier wave, where m is an integer, and wherein the sampled signals are converted to coded digital signals for coding of a prediction value at a selected point, comprising,
    delay means having at least first, second, third, fourth and fifth delay circuits for delaying said coded signals by one dot period, m dot periods, m + 1 dot periods, m × k dot periods, and (m + 1) × k dot periods respectively, where k is an integer, the value of k being such that said fourth delay circuit produces at the output thereof a signal at a sampling point which occurs later than the point which is one horizontal scan period earlier with respect to the signal at said selected point;
    attenuation means coupled to said delay means for attenuating each of the outputs of said delay circuits;
    adding means for summing the outputs of said attenuation means to produce a prediction signal; and
    means for coding the difference between said digital signal and said prediction signal.

9. A DPCM apparatus according to claim 8 wherein the attenuation factors of said attenuation means is set to make the outputs of said first, second, third, fourth, and fifth delay circuits ½, ½, −½, ¼ and ¼ thereof respectively.

* * * * *